Dec. 21, 1965     G. GALLI ET AL     3,224,279
ACCELEROMETER
Filed June 28, 1962
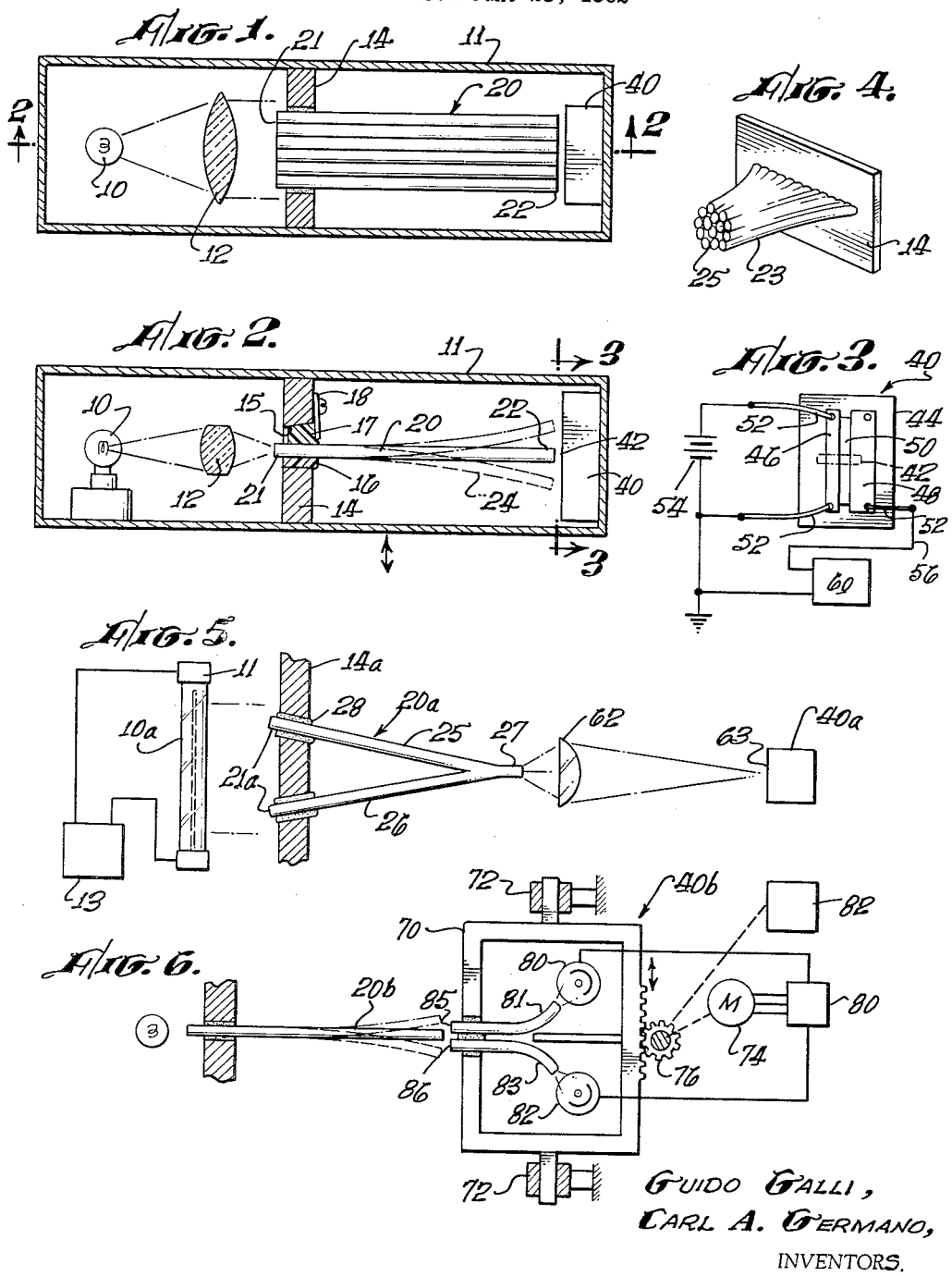
Guido Galli,
Carl A. Germano,
INVENTORS.
BY
Barlow & Lewis United States Patent Office 3,224,279
Patented Dec. 21, 1965

3,224,279
ACCELEROMETER
Guido Galli, Temple City, and Carl A. Germano, Montrose, Calif., assignors to Giannini Controls Corporation, Duarte, Calif., a corporation of New York
Filed June 28, 1962, Ser. No. 205,953
6 Claims. (Cl. 73—517)

This invention has to do generally with accelerometers and provides mechanism that is particularly useful for the detection or measurement of rapidly varying acceleration.

A primary object of the invention is to provide accelerometer structure that is responsive with high sensitivity to rapidly changing values of acceleration, and which is nevertheless small in size, light in weight, and free from the problems of maintenance and wear that are usually associated with delicate moving parts.

The structure of the invention requires no moving parts in the usual sense of that term, comprising typically a single flexure element with integrated pickoff means.

That flexure element comprises one or more optical fibers, having one and fixedly mounted, and extending generally transverse of the acceleration to be detected. Such fibers may be of glass or quartz, for example, or of other suitable radiation transmitting material having suitable index of refraction for the radiation that is to be used. The ability of such fibers to transmit radiation is well known, and it is not necessary to describe detailed techniques for preparing them.

In accordance with the present invention, acceleration readout is accomplished by means of radiation transmitted within the flexure element from its fixed end and emitted as a radiation beam from its movable end. Flexure of the fiber in response to transverse acceleration causes a corresponding change in position of the emitted radiation beam, which is detected or measured by radiation responsive means of any desired type.

For example, a photoelectric cell may be arranged to receive light from the movable end of the fiber under a particular condition of acceleration, producing a signal of digital type indicative of that condition. Alternatively, a signal of analogue type may be developed, with amplitude representing continuously the magnitude of the acceleration.

A particular advantage of the accelerometer structure of the invention is that the mass of the moving element may be made extremely small, greatly facilitating proper damping of its movement. Also, the inherently sall mass of typical optical fibers is associated with high natural frequency, so that rapidly varying accelerations can be followed accurately and without errors due to resonance.

When the accelerometer is to be used with a definite sensitive or input axis, that is, when the acceleration to be measured is in a definite direction, it is ordinarily preferred to provide mechanical restraint upon the optical fiber to confine its movement substantially to a plane parallel to that direction. Such constraint may be obtained by forming the fiber with flattened section, so that it is effectively stiff in one transverse coordinate and flexible in the other. Or a plurality of parallel fibers, each of circular section, may be assembled essentially in the form of a ribbon, which is then flexible normal to its plane. The latter arrangement has the advantage that the light beam emitted from the free end of the ribbon has typically the form of light from an illuminated slit, which is particularly suitable for positional detection.

A further aspect of the invention utilizes two optical fibers arranged in a V of small angle, with their free ends bonded together and their fixed ends mutually spaced in a plane perpendicular to the acceleration to be sensed.

A full understanding of the invention and of its further objects and advantages will be had from the following description of certain illustrative manners in which it may be carried out, of which description the accompanying drawings form a part. The particulars of that description are intended only as illustration of the invention, and not as a limitation upon its scope, which is defined in the appended claims.

In the drawings:
FIG. 1 is a plan, partly in section, representing an illustrative embodiment of the invention;
FIG. 2 is a section on line 2—2 of FIG. 1;
FIG. 3 is a fragmentary section on line 3—3 of FIG. 2;
FIG. 4 is a schematic fragmentary perspective illustrating a modification;
FIG. 5 is a plan, partially in section, representing a further embodiment of the invention; and
FIG. 6 is an elevation representing a further embodiment of the invention.

As shown illustratively in FIGS. 1 to 3, the invention comprises a light source 10, shown typically as an incandescent lamp; a fixed mounting plate 14 with elongated mounting aperture 15; a flat bundle or ribbon 20 of optical fibers having one end 21 fixedly mounted in aperture 15; and means shown schematically at 30 for detecting positional changes in the light emitted from the free end 22 of the optical fibers. Plate 14 typically divides the housing 11 into two chambers, so that light can reach detector 40 only via fibers 20. The fibers of bundle 20 may be secured in aperture 15 in any desired manner, for example by means of blocks of rubber-like material, indicated somewhat schematically at 16 and 17, with a retaining plate 18. Alternatively, the fibers may be mounted with a drop of cement, for example. The free ends of the fibers are deflected upwards or downwards, as seen in FIG. 2, in response to bodily acceleration of the device. Such deflection is represented schematically at 24. If all fibers are identical, their flexure in response to transverse acceleration will be inherently uniform. However, adjacent fibers may be lightly bonded together, as by a flexible cement. Flexure in the plane of the ribbon is thereby substantially prevented.

The light from source 10, normally including radiation from the infared, visible and ultraviolet regions of the spectrum, which may be referred to collectively as optical frequencies. is preferably concentrated on the input ends of the fibers by suitable optical means, typically of conventional form. Such means are represented in FIGS. 1 and 2 as the anamorphic lens 12, which produces essentially parallel light in the plane of FIG. 1, but brings the light to a relatively sharp focus in the plane of FIG. 2. The light image at support 14 therefore conforms substantially to the shape of the fiber bundle. Alternatively, the fibers may extend to the left of support 14, in the manner illustrated at 23 in FIG. 4, so that their input faces may be gathered into a compact bundle of essentially circular section, as at 25, to facilitate illumination. Such rearrangement of fibers of a bundle is described, for example, by N. S. Kapany in appendix N of Concepts of Classical Optics by John Strong, published by W. H. Freeman & Sons in 1958. In the present description and claims, reference to mounting of a fiber at one end is not intended to imply that the fiber element may not have an extension beyond the anchor position for such purposes as light injection.

Each fiber has smooth side walls, and may be bare or coated in known manner with material of lower index of refraction than the fiber itself. Accordingly, light entering an end of the fiber in a direction within a definite critical angle of the fiber axis is totally reflected at the fiber side walls and passes along the fiber with virtually undiminished intensity. Moreover, that property of the fiber of transmitting radiation at high efficiency is substantially independent of gentle curvature of the fiber. Hence light entering the input end of the present fibers is emitted at the end face at the outlet end of the fiber with intensity that is substantially independent of transverse flexure of the fiber. The emitted radiation is indicated schematically at 42, and forms a radiation beam which diverges somewhat from the projected axis of the fiber.

That radiation beam is received by any suitable radiation responsive device, indicated schematically at 40 in FIGS. 1 and 2. One illustrative form of radiation sensor is represented more fully in FIG. 3, comprising a radiation responsive electrical potentiometer of the general type that is described and claimed in the co-pending patent application, Serial No. 833,278 filed on August 12, 1959 by Alexander J. Moncrieff-Yeates and assigned to the same assignee as the present application. That device typically comprises an insulative support 44 having a face 45; an elongated resistive element 46 mounted on support face 45; an elongated highly conductive element 48 mounted on face 45 in parallel spaced relation to resistive element 46; a body 50 of photoconductive material interposed between the elements 46 and 48 and electrically contacting them along substantially their entire length; and electrode structures 52 for making electrical connections to the opposite ends of resistive element 46 and to any convenient point of conductive element 48.

Photoconductive body 50 may be of any suitable material that provides a relatively high resistance between the elements 46 and 48 when in the dark, and that exhibits relatively low resistance when irradiated. An illustrative material is cadmium sulfide which has been suitably treated to enhance its photoconductivity. In the present embodiment, the radiation beam irradiates an area of receiver 40 such as that indicated schematically at 42 in FIG. 3, producing a limited zone of low resistance in the body 50. That zone extends continuously between elements 46 and 48 at a well-defined longitudinal position thereof, that position varying with deflection of fiber bundle 20.

In operation of the described structure, a source of electrical power is connected between the end contacts 52 of resistive element 46. That source may be either alternating or direct current, but is shown illustratively as the battery 54. One end of source 54 may be grounded, as shown. A longitudinal potential gradient is thereby created in resistive element 46. An electrical measuring or indicating device 60 has its input terminals connected to conductive element 48 and to a definite point of resistive element 46. That point may be one end, as illustrated, or may be an intermediate point, at which a suitable tap is provided for that purpose.

The irradiated zone of body 50 forms a relatively low resistance connection between the element 48 and a definite but variable point of resistive element 46. The potential of element 48 is thereby brought substantially to that of resistive element 46 at the point of irradiation. Hence the potential output on line 56 to device 60 constitutes an analogue representation of the fiber deflection, and hence of the instant acceleration.

Flexible element 20 may be damped conveniently by filling housing 11 with a suitable damping fluid, which may, for example, comprise ordinary air at atmospheric pressure, or may be a liquid of conventional type having suitable properties.

The dynamic characteristics of the flexure element may be selectively determined over a wide range in accordance with known laws of mechanics by suitable selection of the dimensions and material. Although shown relatively thick for clarity of illustration, the fibers utilized in the invention may be quite fine, for example of the order of one mil in diameter. When it is preferred to use relatively thick and stiff fibers, their natural frequency may be reduced by a mass of suitable value at or near the free end of the fiber.

In the illustrative embodiment represented in FIG. 5, fiber assembly 20a comprises two fiber elements 25 and 26, arranged in the form of a V and bonded together at their free ends. Such bond may be merely a mechanical connection, produced by a drop of cement, for example; or may involve actual fusion of the two fiber elements to form a single fiber, as at 27. The fixed ends of the fibers are mounted in mutually spaced relation in respective apertures in the mounting plate 14a, as by the drops of cement indicated at 28. The fixed ends 21a of the fibers are illuminated by the lamp 10a, shown as a capillary discharge lamp with electrodes 11 and power source 13. Such a lamp, which may be of conventional type, provides substantially a line of light, and may be mounted in position to illuminate directly both the fiber ends 21a.

Light emitted from the free end of fiber assembly 20a is received by optical means, represented schematically as the lens 62, for magnifying the fiber movement. Lens 62 forms an optical image at 63 on light receiver 40a, which may be of the type already described in connection with FIG. 3. Lens 62 may be of anamorphic type if desired, producing, for example, a light image on receiver 40a that is elongated transversely of its direction of movement.

A particular advantage of the modification of FIG. 5 is the extremely low mass of the flexible fiber assembly, combined with relatively great stability in the plane of the V. The free end of the element is thereby strictly confined to essentially linear movement perpendicular to the plane of the drawing, despite large components of acceleration parallel to that plane. That type of response is useful, for example, for measuring a selected component of complex vibratory accelerations.

The further illustrative embodiment of FIG. 6 utilizes a single fiber element 20b, directly illuminated by a lamp 10. The light responsive mechanism 40b comprises a housing 70 mounted by means of guides 72 for vertical translational movement as seen in the drawing. That movement is driven by the motor 74, as via the rack and pinion indicated at 76. Housing 70 contains two photoelectric devices 80 and 82, which may be of conventional type. The photoelectric devices 80 and 82 are connected to suitable amplifying and indicating means represented schematically at 80, which may typically include servo amplifying means for driving motor 74 in a direction to maintain balance of the input signals from the two devices. Those devices are supplied with light via the respective optical fibers 81 and 83, which are fixedly mounted in the housing with their input ends 85 and 86 protruding from its front face in closely spaced side by side relation.

In normal position of the apparatus, the free end of fiber 20b is immediately opposite the entrance ends of fibers 81 and 83, so that the latter are equally illuminated. In the presence of vertical acceleration, flexure of element 20b tends to illuminate one fiber more brightly than the other, unbalancing amplifier 80 and driving the entire assembly 70 until balance is restored. That movement thus constitutes a measure of the magnitude of the acceleration, and is indicated by a device of any suitable type, represented schematically at 82, which is typically linked mechanically to the drive mechanism 76. Corresponding mechanism may be provided responsive to acceleration perpendicular to the paper in FIG. 6, so that separate indications are obtained of acceleration in each of two mutually perpendicular directions.

By increasing the separation of the input ends of the light-receiving fibers 81 and 83 in FIG. 6, the photocells 80 and 82 may be caused to produce an essentially digital output representing the existing acceleration. In practice a relatively large number of such photocells is required to provide accuracy over an appreciable range of acceleration; but for some purposes it is desired to signal only certain discrete values. For such purposes the described translational movement of housing 70 may be omitted, or may be utilized for calibration of the output, rather than for servo drive to a null condition.

Many changes may be made in the particulars of the embodiments that have been shown and described without departing from the proper scope of the invention, which is defined in the appended claims.

We claim:

1. Means responsive to acceleration and comprising in combination
   a support,
   an optical fiber portion having one end fixedly mounted on the support, the other end having a normal position and being transversely deflectable therefrom in response to bodily acceleration of the support,
   means for injecting electromagnetic radiation of optical frequency into said one end of the fiber portion for longitudinal transmission therein,
   means for receiving radiation emitted from the other end of the fiber portion,
   and means responsive to variations in the position of said received radiation for developing an electrical signal that represents the fiber deflection.

2. Means responsive to acceleration and comprising in combination
   a support,
   an optical fiber portion having one end fixedly mounted on the support, the other end having a normal position and being transversely deflectable therefrom in response to bodily acceleration of the support in a predetermined transverse direction,
   means for injecting electromagnetic radiation of optical frequency into said one end of the fiber portion for longitudinal transmission therein and for emission from said other end thereof,
   at least two sensing optical fibers with radiation receiving ends and radiation emitting ends,
   means mounting said sensing fibers with their radiation receiving ends in a common surface that is transverse with respect to said optical fiber portion and closely spaced longitudinally from said other end thereof, said radiation receiving fiber ends being mutually spaced in said predetermined direction and being substantially aligned with the optical fiber portion in respective different conditions of deflection thereof,
   and radiation responsive means selectively responsive to radiation emitted from the radiation emitting ends of the respective sensing fibers.

3. Means responsive to acceleration as defined in claim 2,
   said fiber mounting means being drivable to move the radiation receiving ends of the sensing fibers parallel to said common surface in said predetermined direction,
   and including means for driving said fiber mounting means under control of the radiation responsive means to maintain a predetermined relationship between the radiation emitted from the radiation emitting ends of the respective sensing fibers,
   and means coupled with said driving means for indicating acceleration in said predetermined direction.

4. Means responsive to acceleration and comprising in combination
   a support,
   a plurality of optical fibers having respective fixed portions mounted in generally parallel relation in a common plane on the support and respective free portions extending in one direction from the support,
   means interconnecting the free fiber portions to produce a flat fiber assembly that is deflectable bodily transversely of its plane in response to transverse bodily acceleration of the support and that is effectively stiff against deflection parallel to its plane,
   said free fiber portions terminating substantially at a common transverse surface,
   means for injecting electromagnetic radiation of optical frequency into all said fibers for transmission from the fixed portions into the free portions thereof and for emission at said transverse surface to form a radiation beam that changes position in response to deflection of the fiber assembly,
   and radiation responsive means in the path of the beam responsive to said position changes thereof for indicating said transverse acceleration.

5. Means responsive to acceleration as defined in claim 4, and wherein
   said optical fibers include also light injection portions extending from said fixed portions oppositely to said one direction and terminating in transverse light receiving faces,
   the light injection fiber portions adjacent their said faces forming a bundle of compact section with the light receiving faces substantially in a common transverse surface,
   and said means for injecting radiation comprising means for projecting a radiation beam essentially along the axis of said bundle onto the light receiving faces.

6. Means responsive to acceleration and comprising in combination
   a support,
   at least two optical fibers having respective fixed portions mounted in mutually spaced relation on the support and respective free portions extending from the support normally in a common plane and in mutually oblique relation, the free ends of said free portions being mutually adjacent and interconnected to form an essentially planar fiber structure,
   said free fiber portions terminating substantially at a common transverse surface,
   said planar structure being deflectable transversely of its plane in response to transverse bodily acceleration of the support, and being effectively stiff against deflection parallel to its plane,
   means for injecting electromagnetic radiation of optical frequency into both said fibers for transmission from the fixed portions into the free portions thereof and for emission at said transverse surface to form a radiation beam that changes position in response to fiber deflection,
   and radiation responsive means in the path of the beam responsive to said position changes thereof for indicating said transverse acceleration.

References Cited by the Examiner

UNITED STATES PATENTS

| | | | |
|---|---|---|---|
| 2,322,681 | 6/1943 | Zenor | 73—517 X |
| 2,882,034 | 4/1959 | Wuerth | 73—517 |
| 2,899,190 | 8/1959 | Driver | 73—517 |
| 2,932,499 | 4/1960 | Tarran | 73—547 |
| 3,146,057 | 8/1964 | Rona | 73—70.2 X |

RICHARD C. QUEISSER, *Primary Examiner.*

ROBERT L. EVANS, JAMES J. GILL, *Examiners.*

UNITED STATES PATENT OFFICE
CERTIFICATE OF CORRECTION

Patent No. 3,224,279                        December 21, 1965

Guido Galli et al.

It is hereby certified that error appears in the above numbered patent requiring correction and that the said Letters Patent should read as corrected below.

Column 5, line 26, after "deflection", the period should be a comma, and insert the following:

> said radiation receiving means comprising a plurality of optical fibers fixedly mounted with one end longitudinally spaced from said other end of said optical fiber portion and substantially aligned therewith under respective definite conditions of deflection thereof,
> and said radiation responsive means comprising means selectively responsive to radiation transmitted by the respective optical fibers of said plurality.

Signed and sealed this 25th day of October 1966.

(SEAL)
Attest:

ERNEST W. SWIDER                        EDWARD J. BRENNER
Attesting Officer                      Commissioner of Patents